(12) United States Patent
Kim et al.

(10) Patent No.: US 9,037,449 B2
(45) Date of Patent: May 19, 2015

(54) METHOD FOR ESTABLISHING PARAPHRASING DATA FOR MACHINE TRANSLATION SYSTEM

(71) Applicant: Electronics and Telecommunications Research Institute, Daejeon (KR)

(72) Inventors: Chang Hyun Kim, Daejeon (KR); Young-Ae Seo, Daejeon (KR); Seong Il Yang, Daejeon (KR); Jinxia Huang, Daejeon (KR); Jong Hun Shin, Daejeon (KR); Young Kil Kim, Daejeon (KR); Sang Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 220 days.

(21) Appl. No.: 13/664,881

(22) Filed: Oct. 31, 2012

(65) Prior Publication Data
US 2013/0110493 A1 May 2, 2013

(30) Foreign Application Priority Data

Oct. 31, 2011 (KR) ........................ 10-2011-0112524

(51) Int. Cl.
G06F 17/28 (2006.01)
G06F 17/20 (2006.01)
(52) U.S. Cl.
CPC ........ *G06F 17/2818* (2013.01); *G06F 17/2827* (2013.01)
(58) Field of Classification Search
USPC ...................................................... 704/1–10
See application file for complete search history.

(56) References Cited

U.S. PATENT DOCUMENTS

| 7,412,385 | B2* | 8/2008 | Brockett et al. | 704/245 |
| 7,937,265 | B1* | 5/2011 | Pasca et al. | 704/9 |
| 2011/0295591 | A1* | 12/2011 | Fang et al. | 704/9 |
| 2012/0109623 | A1* | 5/2012 | Dolan et al. | 704/2 |

FOREIGN PATENT DOCUMENTS

KR 2009-0010522 1/2009

OTHER PUBLICATIONS

Bannard et al. "Paraphrasing with Bilingual Parallel Corpora". Proceedings of the 43rd Annual Meeting of the ACL, pp. 597-604, Ann Arbor, Jun. 2005.*
Regina Barzilay, et al., "Learning to Paraphrase: An Unsupervised Approach Using Multiple-Sequence Alignment," Proceedings of HLT-NAACL, May-Jun. 2003, pp. 16-23.

* cited by examiner

*Primary Examiner* — Jesse Pullias
(74) *Attorney, Agent, or Firm* — Staas & Halsey LLP

(57) ABSTRACT

A method for establishing paraphrasing data for a machine translation system includes selecting a paraphrasing target sentence through application of an object language model to a translated sentence that is obtained by machine-translating a source language sentence, extracting paraphrasing candidates that can be paraphrased with the paraphrasing target sentence from a source language corpus DB, performing machine translation with respect to the paraphrasing candidates, selecting a final paraphrasing candidate by applying the object language model to the result of the machine translation with respect to the paraphrasing candidates, and confirming the paraphrasing target sentence and the final paraphrasing candidate as paraphrasing lexical patterns using a bilingual corpus and storing the paraphrasing lexical patterns in a paraphrasing DB. According to the present invention, the consistent paraphrasing data can be established since the paraphrasing data is automatically established.

13 Claims, 2 Drawing Sheets

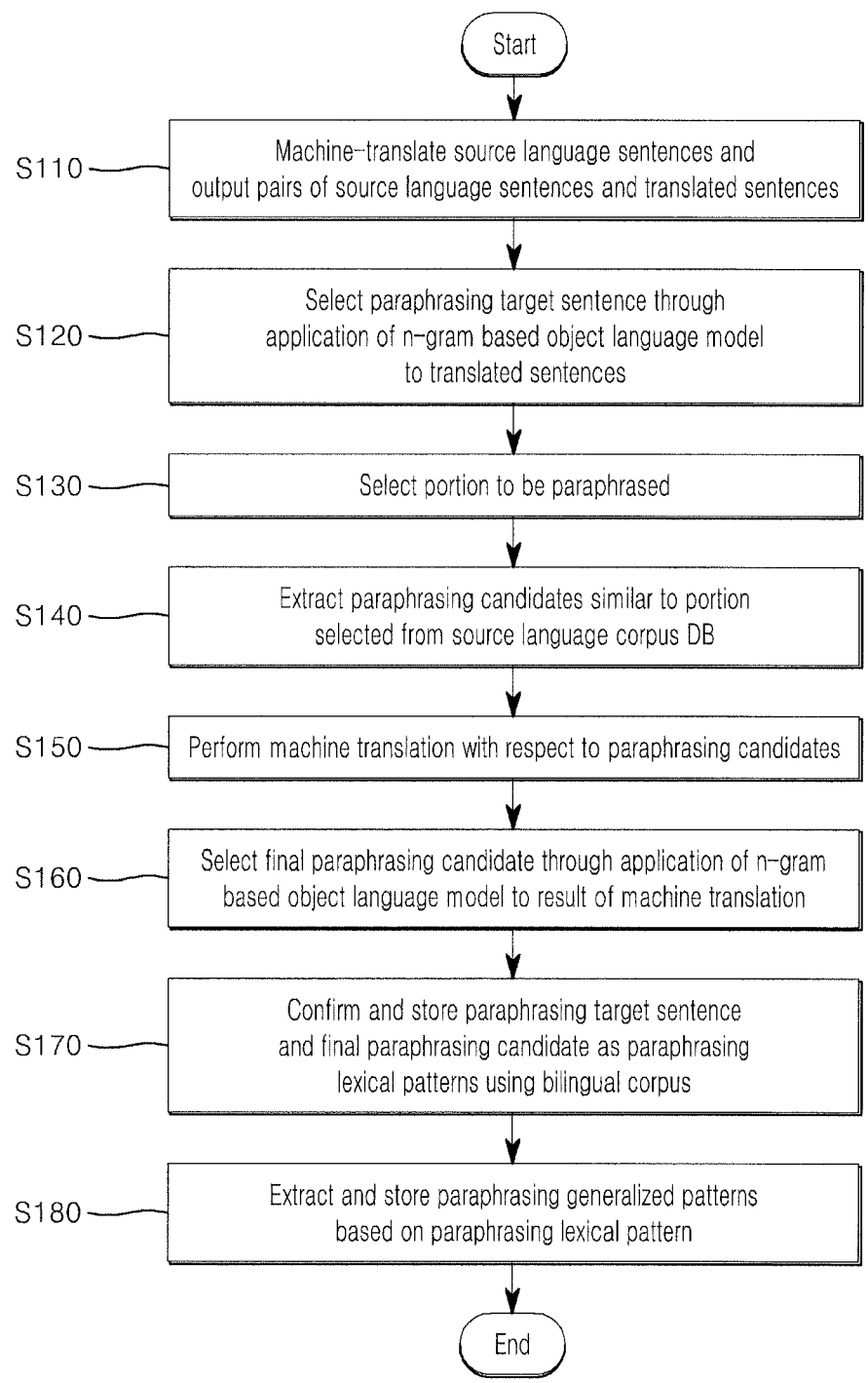

METHOD FOR ESTABLISHING PARAPHRASING DATA FOR MACHINE TRANSLATION SYSTEM

CROSS-REFERENCES TO RELATED APPLICATIONS

The present application claims priority under 35 U.S.C 119(a) to Korean Application No. 10-2011-0112524, filed on Oct. 31, 2011, in the Korean Intellectual Property Office, which is incorporated herein by reference in its entirety set forth in full.

BACKGROUND

Exemplary embodiments of the present invention relate to a method for establishing paraphrasing data for a machine translation system, and more particularly to a method for establishing paraphrasing data for a machine translation system, which can improve the performance of machine translation through automatic establishment of the paraphrasing data of a source language.

In general, a machine translation technology means a technology to automatically convert one language into another language using a natural language processing technique in order to solve the communication problem due to the language barrier.

Among several methods for machine translation, researches for a statistical machine translation (SMT) technology to learn parameters of a model through statistical analysis of a bilingual corpus and to translate an input sentence based on the model have been actively made.

Further, statistical model used in the statistical machine translation have gradually been high-leveled, and researches for a paraphrasing method have been made for an effective translation of idiomatic phrase expressions.

In order to use such a paraphrasing method, it is important to establish paraphrasing data of a source language. A method for establishing paraphrasing data in the related art may be classified into a method using a bilingual corpus and a method for manually establishing paraphrasing data from source language sentences.

First, the method using a bilingual corpus is configured to compare all pairs of source language sentences and object language sentences of the bilingual corpus, assume all source language sentences having the same object language sentence as one paraphrasing sentence, and extract paraphrasing data in the unit of a sentence between sets of the source language sentences.

However, this method has the problem that it is unable to be applied if there is no bilingual corpus. Further, paraphrasing in the unit of a sentence has a narrow application range, and if paraphrasing in the unit of a word or syntax is required, this method is unable to be properly applied.

On the other hand, the method for manually establishing paraphrasing data from source language sentences has problems from three aspects as follows.

First, since it is not easy to accurately define to what level the paraphrasing is to be performed, it is difficult to establish the paraphrasing data.

Second, since the paraphrasing data is manually established, there is a lack of consistency in this method.

That is, since there is a difference between persons in determining the level of the paraphrasing, whether the paraphrasing data has been established and the results of the paraphrasing establishment with respect to the same sentence may differ to cause a lack of consistency.

Last, this method has the problem that the paraphrasing data may occur irrespective of the improvement of the machine translation performance.

That is, since the result of the paraphrasing for language education may differ from the result of the paraphrasing for machine translation, the paraphrasing data for language education may be of no use in improving the machine translation performance.

SUMMARY

An embodiment of the present invention relates to a method for establishing paraphrasing data for a machine translation system, which can improve the performance of machine translation through automatic establishment of the paraphrasing data of a source language.

In one embodiment, a method for establishing paraphrasing data for a machine translation system includes: selecting a paraphrasing target sentence through application of an object language model to a translated sentence that is obtained by machine-translating a source language sentence; extracting paraphrasing candidates that can be paraphrased with the paraphrasing target sentence from a source language corpus DB; performing machine translation with respect to the paraphrasing candidates; selecting a final paraphrasing candidate by applying the object language model to the result of the machine translation with respect to the paraphrasing candidates; and confirming the paraphrasing target sentence and the final paraphrasing candidate as paraphrasing lexical patterns using a bilingual corpus and storing the paraphrasing lexical patterns in a paraphrasing DB.

The method for establishing paraphrasing data for a machine translation system according to one embodiment may further include extracting paraphrasing generalized patterns based on the paraphrasing lexical patterns and storing the paraphrasing generalized patterns in the paraphrasing DB.

In the step of selecting the paraphrasing target sentence, the object language model may be an n-gram based object language model.

The step of selecting the paraphrasing target sentence may select the source language sentence that corresponds to the translated sentence as the paraphrasing object sentence if the translated sentence includes a string having a frequency of use in the object language that is equal to or lower than a reference frequency of use.

The step of extracting the paraphrasing candidates may include selecting a portion to be paraphrased in the paraphrasing target sentence; and extracting the paraphrasing candidates that are similar to the selected portion from the source language corpus DB.

The step of selecting the portion to be paraphrased may select the portion to be paraphrased using link information of the string that occurs with the frequency of use that is equal to or lower than the reference frequency of use in the object language among the strings included in the paraphrasing target sentence.

The step of extracting the paraphrasing candidates may extract the paraphrasing candidates in an n-best form.

In the step of selecting the final paraphrasing candidate, the object language model may be an n-gram based object language model.

The step of selecting the final paraphrasing candidate may select the source language sentence that corresponds to the translated sentence having the highest frequency of use among the results of the machine translation with respect to the paraphrasing candidates.

The step of confirming and storing the paraphrasing lexical patterns in the paraphrasing DB may include extracting the source language sentences that include the paraphrasing target sentence from the bilingual corpus; extracting the paraphrasing sentences that include the final paraphrasing candidate from the bilingual corpus; and confirming the paraphrasing target sentence and the final paraphrasing candidate as the paraphrasing lexical patterns based on the object language portions of the source language sentences and the paraphrasing sentences.

The confirming may confirm the paraphrasing target sentence and the final paraphrasing candidate as the paraphrasing lexical patterns if the object language portions of the source language sentences coincide with the object language portions of the paraphrasing sentences.

The confirming may confirm the paraphrasing target sentence and the final paraphrasing candidate as the paraphrasing lexical patterns if the result of the machine translation of the final paraphrasing candidate is commonly included in the object language portions of the source language sentences and the object language portions of the paraphrasing sentences.

According to the present invention, the paraphrasing data is automatically established using the results of the machine translation of the source language sentences, the object language models, and the bilingual corpus, and thus the consistent paraphrasing data can be established.

Further, according to the present invention, since the portion to be paraphrased is selected from the source language sentence and the paraphrasing data for the selected portion is established, data that can be applied to the paraphrasing in the unit of a word or syntax can be established.

Last, the paraphrasing lexical patterns and the paraphrasing generalized patterns which are automatically established through the present invention can directly contribute to the improvement of the machine translation performance of the machine translation system.

BRIEF DESCRIPTION OF THE DRAWINGS

The above and other aspects, features and other advantages will be more clearly understood from the following detailed description taken in conjunction with the accompanying drawings, in which:

FIG. 2 illustrates a flowchart of a method for establishing paraphrasing data for a machine translation system according to an embodiment of the present invention.

DESCRIPTION OF SPECIFIC EMBODIMENTS

Figure 1:
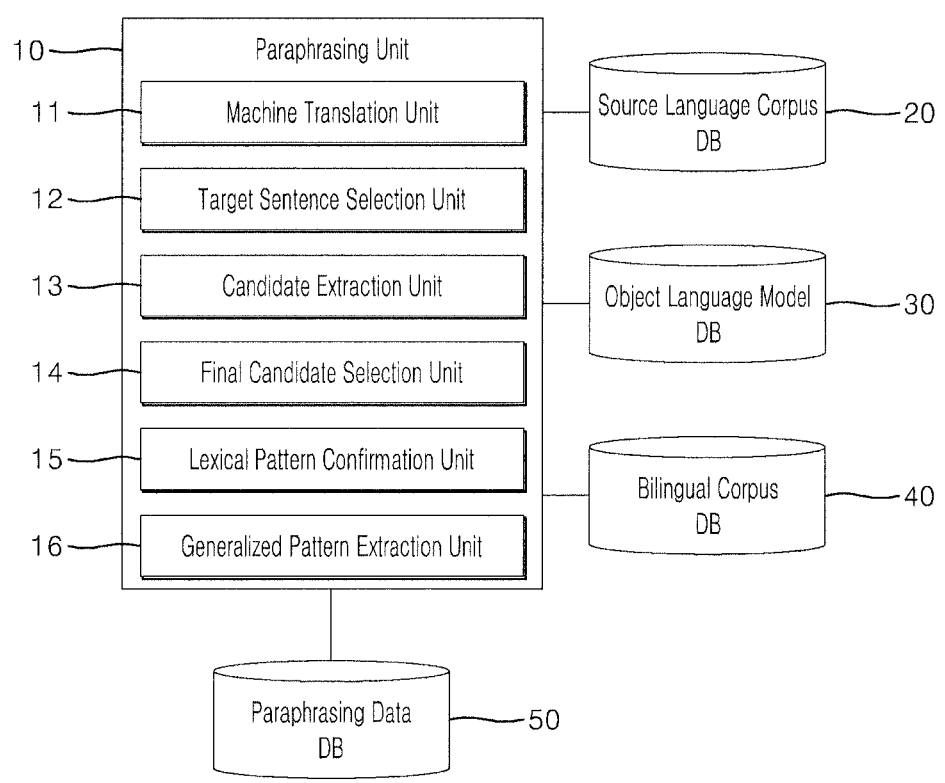
FIG. 1 illustrates a block diagram of an apparatus for establishing paraphrasing data for a machine translation system according to an embodiment of the present invention.

Hereinafter, a method for establishing paraphrasing data for a machine translation system according to an embodiment of the present invention will be described in detail with reference to accompanying drawings. In the drawings, line thicknesses or sizes of elements may be exaggerated for clarity and convenience. Also, the following terms are defined considering function of the present invention, and may be differently defined according to intention of an operator or custom. Therefore, the terms should be defined based on overall contents of the specification.

FIG. 1 illustrates a block diagram of an apparatus for establishing paraphrasing data for a machine translation system according to an embodiment of the present invention.

As shown in FIG. 1, an apparatus for establishing paraphrasing data for a machine translation system according to an embodiment of the present invention includes a paraphrasing unit 10, a source language corpus DB 20, an object language model DB 30, a bilingual corpus DB 40, and a paraphrasing data DB 50.

The source language corpus DB 20 stores data of a source language that is used as an input for machine translation.

The object language model DB 30 stores object language model data how many times a string of a translated sentence is used in an object language actually.

The bilingual corpus DB 40 stores bilingual corpus data in which information on translation of source language sentences and object sentences is collected.

The paraphrasing unit 10 automatically extracts paraphrasing data using the results of machine translation with respect to the source language sentences and data stored in the source language corpus DB 20, the object language model DB 30, and the bilingual corpus DB 40, and stores the extracted paraphrasing data in the paraphrasing data DB 50.

The paraphrasing unit 10 may include a machine translation unit 11, a target sentence selection unit 12, a candidate extraction unit 13, a final candidate selection unit 14, a lexical pattern confirmation unit 15, and a generalized pattern extraction unit 16.

The machine translation unit 11 translates the source language sentences in the source language corpus DB 20, and outputs the results of the machine translation as pairs of the source language sentences and translated sentences.

The target sentence selection unit 12 selects paraphrasing target sentences through comparison of the translated sentences output from the machine translation unit 11 with the object language models stored in the object language model DB 30.

Specifically, the target sentence selection unit 12 applies an n-gram based object language model to the translated sentence output from the machine translation unit 11, and if the corresponding translated sentence includes a string which is difficult to occur in the object language, the target sentence selection unit 12 may select the corresponding source language sentence as a paraphrasing target sentence.

The candidate extraction unit 13 selects a portion to be paraphrased from the paraphrasing target sentence selected by the target sentence selection unit 12, searches for sentences that can be paraphrased around the selected portion in the source language corpus DB 20, and extracts paraphrasing candidates having high similarity.

At this time, the candidate extraction unit 13 can extract the paraphrasing candidates in an n-best form.

The final candidate selection unit 14 selects the sentence having the highest frequency of use as the final paraphrasing candidate through application of the n-gram based object language model stored in the object language model DB 30 to the results of the machine translation with respect to the candidates extracted from the candidate extraction unit 13.

The lexical pattern confirmation unit 15 confirms whether the paraphrasing target sentence and the final paraphrasing candidate are in a paraphrasing relationship using the bilingual corpus stored in the bilingual corpus DB 40, and if they are in the paraphrasing relationship, the lexical pattern confirmation unit 15 confirms them as the paraphrasing lexical patterns.

The generalized pattern extraction unit 16 extracts paraphrasing generalized patterns based on the paraphrasing lexical patterns confirmed by the lexical pattern confirmation unit 15.

Thereafter, the paraphrasing lexical patterns confirmed by the lexical pattern confirmation unit 15 and the paraphrasing generalized patterns extracted by the generalized pattern extraction unit 16 are stored in the paraphrasing data DB 50.

FIG. 2 illustrates a flowchart of a method for establishing paraphrasing data for a machine translation system according to an embodiment of the present invention. Referring to FIG. 2, the overall operation of the present invention will be described.

First, the machine translation unit 11 of the paraphrasing unit 10 translates the source language sentences and outputs the results of the machine translation as pairs of the source language sentences and translated sentences (S110).

At this time, the machine translation unit 11 performs the machine translation using link information of respective words that constitute the source language sentence and alignment information in the unit of a word.

For example, as shown in Table 1 below, a translated sentence "There are lots that clothes are beautiful." is output with respect to a source language sentence "옷이 예쁜 것들이 많아요."

TABLE 1

| Source language sentence | 옷이 예쁜 것들이 많아요. |
|---|---|
| Link information | Clothes are beautiful that there are lots. |
| Translated sentence | There are lots that clothes are beautiful. |

Thereafter, the target sentence selection unit 12 of the paraphrasing unit 10 selects the paraphrasing target sentences to be paraphrased through application of the n-gram based object language model stored in the object language model DB 30 to the translated sentence output from the machine translation unit 11 (S120).

At this time, if a string which is difficult to occur in the object language is extracted as the result of applying the n-gram based object language model to the translated sentence output from the machine translation unit 11, the target sentence selection unit 12 may select the corresponding source language sentence as the paraphrasing target sentence.

Specifically, if the frequency of use of the string in the object language is equal to or lower than the reference frequency of use, the target sentence selection unit 12 may determine that it is difficult for the corresponding string to occur in the object.

Here, the reference frequency of use means the frequency of use for determining whether to perform the paraphrasing in a state where a specified string is difficult to occur in the object language, and may be variously selected according to a designer's intention.

Table 2 below shows the results of applying the n-gram based object language model to a translated sentence "There are lots that clothes are beautiful." output from the machine translation unit 11, which is performed by the target sentence selection unit 12.

As the results of the above-described application, the translated sentence includes strings, such as "Lots that clothes", "Are lots that clothes", and "Lots that clothes are", which have very low frequency of use in the object language, and thus the target sentence selection unit 12 may select "옷이 예쁜 것들이 많아요", which is the corresponding source language sentence, as the paraphrasing target sentence.

As described above, by the target sentence selection unit 12, the sentence, of which the translation has not been properly made, may be selected as the paraphrasing target sentence.

TABLE 2

| n-gram | Strings | Frequency of use |
|---|---|---|
| 3-gram | There are lots | 466,960 |
| | Are lots that | 779 |
| | Lots that clothes | 0 |
| | That clothes are | 1,719 |
| | Clothes are beautiful | 1,604 |
| 4-gram | There are lots that | 562 |
| | Are lots that clothes | 0 |
| | Lots that clothes are | 0 |
| | That clothes are beautiful | 0 |

Thereafter, the candidate extraction unit 13 of the paraphrasing unit 10 selects the portion to be paraphrased using the link information that corresponds to the string which is difficult to occur in the object language (S130).

That is, the candidate extraction unit 13 selects the portion of which the translation has not been properly made as the portion to be paraphrased.

For example, the candidate extraction unit 13 may select "옷이 예쁜 것들이 많아요" as shown in Table 3 below as the portion to be paraphrased using the link information that corresponds to "Lots that clothes" and "Are lots that clothes" in Table 2 as described above.

TABLE 3

| Portion | 옷이 | 예쁜 | 것들이 | 많아요 |
|---|---|---|---|---|
| Link information | Clothes | Are beautiful | That | There are lots |

Since the candidate extraction unit 13 selects the portion to be paraphrased as described above, it becomes possible to extract the paraphrasing data only with respect to the portion of which the translation has not been properly made.

For example, if the initial source language sentence includes the portion "옷이 예쁜 것들이 많아요" and the translation of the remaining portion has been properly made, the paraphrasing data is extracted only with respect to the portion "옷이 예쁜 것들이 많아요" of which the translation has not been properly made.

Thus, according to the present invention, the paraphrasing data in the unit of a word or syntax can be extracted rather than the paraphrasing data in the unit of a sentence.

Then, the candidate extraction unit 13 extracts the paraphrasing candidates having the highest similarity through comparison of the portion that is selected to be paraphrased with the data stored in the source language corpus DB 20 (S140).

That is, the candidate extraction unit 13 may extract a set of the n-best paraphrasing candidates having a high similarity to "옷이 예쁜 것들이 많아요" as shown in Table 4 below.

TABLE 4

| 옷이 예쁜 것이 많아요. |
| 예쁜 옷들이 많아요. |
| 예쁜 옷이 많아요.. |
| ... |

If there is no paraphrasing candidate extracted or the number of the extracted candidates is too small, the candidate extraction unit 13 may extract the paraphrasing candidates by applying a method of correcting the source language sentences.

For example, the candidate extraction unit 13 may extract the paraphrasing candidates through correction of a word "많아요" to "많습니다" or "많다".

Then, the machine translation unit 11 of the paraphrasing unit 10 generates the results of the machine translation with respect to the paraphrasing candidates extracted by the candidate extraction unit 13 (S150).

For example, the machine translation unit 11 may generate the results of the machine translation with respect to the extracted paraphrasing candidates as shown in Table 5 below.

TABLE 5

| | |
|---|---|
| 옷이 예쁜 것이 많아요. | |
| It is abundant that clothes are beautiful. | |
| 예쁜 옷들이 많아요. | |
| There are lots of pretty clothes. | |
| 예쁜 옷이 많아요.. | |
| There are lots of pretty clothes. | |

Thereafter, the final candidate selection unit 14 of the paraphrasing unit 10 may select the paraphrasing candidate having the highest frequency of use as the final paraphrasing candidate through application of the n-gram based object language model to the results of the machine translation generated by the machine translation unit 11 (S160).

For example, the results of applying the n-gram based object language model to the results of the machine translation as shown in Table 5 are as shown in Table 6 below, and at this time, the final candidate selection unit 14 may select "There are lots of pretty clothes." having the highest frequency of use as the final paraphrasing candidate.

Through the above-described operation, the candidate, of which the translation has been made most excellently, can be selected as the final paraphrasing candidate.

TABLE 6

| | | |
|---|---|---|
| 3-gram | There are lots | 499,960 |
| | There is lots | 77,083 |
| | Are lots of | 1,049,046 |
| | Is lots of | 150,967 |
| | Lots of pretty | 15,100 |
| | Of pretty clothes | 161 |
| 4-gram | There are lots of | 460,546 |
| | There is lots of | 61,006 |
| | Are lots of pretty | 918 |
| | Is lots of pretty | 0 |
| | Lots of pretty clothes | 81 |

The paraphrasing target sentence selected through the target sentence selection unit 12 of the paraphrasing unit 10 and the final paraphrasing candidate selected through the candidate extraction unit 13 and the final candidate selection unit 14 may be summarized as in Table 7 below.

TABLE 7

| | |
|---|---|
| Paraphrasing target sentence (Paraphrasing source) | 옷이 예쁜 것들이 많아요. There are lots that clothes are beautiful. |
| Final paraphrasing candidate (Paraphrasing result) | 예쁜 옷들이 많아요. There are lots of pretty clothes. |

The final paraphrasing candidate selected as above may be a sentence of which the translation has been made most excellently among similar sentences of the paraphrasing target sentences, but it may not be certain whether the corresponding sentences are in the paraphrasing relationship.

Accordingly, the lexical pattern confirmation unit 15 of the paraphrasing unit 10 determines whether the paraphrasing target sentence and the final paraphrasing candidate are in the paraphrasing relationship using the bilingual corpus stored in the bilingual corpus DB 40, and if it is determined that they are in the paraphrasing relationship, the lexical pattern confirmation unit 15 confirms the corresponding sentences as the paraphrasing lexical patterns (S170).

Specifically, the lexical pattern confirmation unit 15 extracts the source language sentences including the paraphrasing target sentences from the bilingual corpus as shown in Table 8 below.

TABLE 8

| |
|---|
| 이 가게에는 옷이 예쁜 것들이 많아요. |
| There are lots of pretty clothes in this store. |
| . . . |
| 옷이 예쁜 것들이 많아요. |
| We have many pretty clothes. |

In the same manner, the lexical pattern confirmation unit 15 extracts the paraphrasing sentences including the final paraphrasing candidate from the bilingual corpus as shown in Table 9 below.

TABLE 9

| |
|---|
| 여기에는 예쁜 옷들이 많아요. |
| There are lots of pretty clothes in here. |
| . . . |
| 예쁜 옷들이 많아요. |
| We have many pretty clothes. |

If there is a candidate in which the object language portion of the extracted source language sentences coincide with the object language portion of the paraphrasing sentences, the lexical pattern confirmation unit 15 may confirm the paraphrasing target sentence and the final paraphrasing candidate as the final paraphrasing lexical patterns.

That is, "옷이 예쁜 것들이 많아요." and "예쁜 옷들이 많아요.", of which object language portions "We have many pretty clothes." coincide with each other as in Table 8 and Table 9, may be confirmed as the final paraphrasing lexical patterns as in Table 10 below.

TABLE 10

| |
|---|
| 옷이 예쁜 것들이 많아요We have many pretty clothes. |
| 옷이 예쁜 것들이 많아요 |

Further, the lexical pattern confirmation unit 15 may confirm the paraphrasing target sentence and the final paraphrasing candidate as the paraphrasing lexical patterns if the result of the machine translation of the final paraphrasing candidate is commonly included in the object language portions of the extracted source language sentences and the object language portions of the paraphrasing sentences.

Referring to Table 11 below, the portion "There are lots of pretty clothes.", which is the result of the machine translation with respect to the final paraphrasing candidate "예쁜 옷들이 많아요.", is commonly included in the object language portions of "이 가게에는 옷이 예쁜 것들이 많아요." and "여기에는 예쁜 옷들이 많아요."

Accordingly, "옷이 예쁜 것들이 많아요." and "예쁜 옷들이. 많아요." may be confirmed as the final paraphrasing lexical patterns as shown in Table 10 as above.

TABLE 11

| | Source sentence | Translated sentence |
|---|---|---|
| Paraphrasing target sentence | 옷이 예쁜 것들이 많아요 | |
| Source sentence including target sentence | 이 가게에는 옷이 예쁜 것들이 많아요. | There are lots of pretty clothes in this store. |
| Final paraphrasing candidate | 예쁜 옷들이 많아요 | There are lots of pretty clothes. |
| Paraphrasing sentence including final candidate | 여기에는 예쁜 옷들이 많아요. | There are lots of pretty clothes in here. |

Last, the generalized pattern extraction unit 16 extracts the paraphrasing generalized pattern based on the paraphrasing lexical patterns (S180).

For example, the paraphrasing generalized patterns such as "(N)이 (V)ㄴ 것들이 많아요: (V)ㄴ (N)들이 많아요" may be extracted on the basis of the paraphrasing lexical patterns having the same sentence structure of "옷이 예쁜 것들이 많아요: 예쁜 옷들이 많아요" as shown in Table 12 below. Here, (V) and (N) denote a verb and a noun.

TABLE 12

옷이 예쁜 것들이 많아요 : 예쁜 옷들이 많아요
...
색이 파란 것들이 많아요 : 파란 색들이 많아요
--> (N)이 (V)ㄴ 것들이 많아요 : (V)ㄴ (N)들이 많아요

The paraphrasing lexical patterns and the paraphrasing generalized patterns extracted through the above-described series of operations are stored in the paraphrasing data DB 50.

As described above, the paraphrasing data is automatically established using the results of the machine translation of the source language sentences, the object language models, and the bilingual corpus, and thus the consistent paraphrasing data can be established.

Further, the paraphrasing lexical patterns and the paraphrasing generalized patterns which are automatically established through the present invention can directly contribute to the improvement of the machine translation performance of the machine translation system.

On the other hand, according to the present invention, it has been described that the lexical pattern confirmation unit 15 determines whether the paraphrasing target sentence and the final paraphrasing candidate are in the paraphrasing relationship using the bilingual corpus to determine the paraphrasing lexical patterns. However, the determination of the paraphrasing relationship may be manually made.

The embodiment of the present invention has been disclosed above for illustrative purposes. Those skilled in the art will appreciate that various modifications, additions and substitutions are possible, without departing from the scope and spirit of the invention as disclosed in the accompanying claims.

What is claimed is:

1. A method for establishing paraphrasing data for a machine translation system comprising:
    selecting a paraphrasing target sentence through application of an object language model to a translated sentence that is obtained by machine-translating a source language sentence;
    extracting, from a corpus DB for the source language, paraphrasing candidates that can be paraphrased with the selected paraphrasing target sentence;
    performing machine translation with respect to the extracted paraphrasing candidates;
    selecting a final paraphrasing candidate from the extracted paraphrasing candidates by applying the object language model to a result of the machine translation with respect to the extracted paraphrasing candidates; and
    confirming a paraphrasing relationship of the paraphrasing target sentence and the selected final paraphrasing candidate as paraphrasing lexical patterns using a bilingual corpus and storing the paraphrasing lexical patterns in a paraphrasing DB.

2. The method for establishing paraphrasing data for a machine translation system of claim 1, further comprising extracting paraphrasing generalized patterns based on the paraphrasing lexical patterns and storing the paraphrasing generalized patterns in the paraphrasing DB.

3. The method for establishing paraphrasing data for a machine translation system of claim 1, wherein in the selecting the paraphrasing target sentence, the object language model is an n-gram based object language model.

4. The method for establishing paraphrasing data for a machine translation system of claim 3, wherein the selecting the paraphrasing target sentence selects the source language sentence that corresponds to the translated sentence as the paraphrasing object sentence if the translated sentence includes a string having a frequency of use in the object language that is equal to or lower than a reference frequency of use.

5. The method for establishing paraphrasing data for a machine translation system of claim 1, wherein the extracting the paraphrasing candidates comprises:
    selecting a portion to be paraphrased in the paraphrasing target sentence; and
    extracting the paraphrasing candidates that are similar to the selected portion from the source language corpus DB.

6. The method for establishing paraphrasing data for a machine translation system of claim 5, wherein the selecting the portion to be paraphrased selects the portion to be paraphrased using link information of the string that occurs with the frequency of use that is equal to or lower than the reference frequency of use in the object language among the strings included in the paraphrasing target sentence.

7. The method for establishing paraphrasing data for a machine translation system of claim 1, wherein the extracting the paraphrasing candidates extracts the paraphrasing candidates in an n-best form.

8. The method for establishing paraphrasing data for a machine translation system of claim 1, wherein in the selecting the final paraphrasing candidate, the object language model is an n-gram based object language mode.

9. The method for establishing paraphrasing data for a machine translation system of claim 1, wherein the selecting the final paraphrasing candidate selects the source language sentence that corresponds to the translated sentence having the highest frequency of use among the results of the machine translation with respect to the paraphrasing candidates.

10. The method for establishing paraphrasing data for a machine translation system of claim 1, wherein the confirming and storing the paraphrasing lexical patterns in the paraphrasing DB comprises:
    extracting the source language sentences that include the paraphrasing target sentence from the bilingual corpus;
    extracting the paraphrasing sentences that include the final paraphrasing candidate from the bilingual corpus; and confirming the paraphrasing target sentence and the final paraphrasing candidate as the paraphrasing lexical patterns based on the object language portions of the source language sentences and the paraphrasing sentences.

11. The method for establishing paraphrasing data for a machine translation system of claim 10, wherein the confirming confirms the paraphrasing target sentence and the final paraphrasing candidate as the paraphrasing lexical patterns if the object language portions of the source language sentences coincide with the object language portions of the paraphrasing sentences.

12. The method for establishing paraphrasing data for a machine translation system of claim 10, wherein the confirming confirms the paraphrasing target sentence and the final paraphrasing candidate as the paraphrasing lexical patterns if the result of the machine translation of the final paraphrasing candidate is commonly included in the object language portions of the source language sentences and the object language portions of the paraphrasing sentences.

13. An apparatus capable of machine language translation, comprising:

a paraphrasing machine configured to:
    select a paraphrasing target sentence through application of an object language model to a translated sentence obtained by machine-translating a source language sentence;
    extract, from a corpus DB for the source language, paraphrasing candidates that can be paraphrased with the selected paraphrasing target sentence;
    perform machine translation with respect to the extracted paraphrasing candidates;
    select a final paraphrasing candidate from the extracted paraphrasing candidates by applying the object language model to a result of the machine translation with respect to the extracted paraphrasing candidates; and
    confirm a paraphrasing relationship of the paraphrasing target sentence and the selected final paraphrasing candidate as paraphrasing lexical patterns using a bilingual corpus and storing the paraphrasing lexical patterns in a paraphrasing DB.

* * * * *